(12) United States Patent
Blume

(10) Patent No.: US 7,472,517 B2
(45) Date of Patent: Jan. 6, 2009

(54) BILEVEL BICYCLE STORAGE SYSTEM

(76) Inventor: Ernst Blume, Schucker Str. 18, 48153, Münster (DE)

( * ) Notice: Subject to any disclaimer, the term of this patent is extended or adjusted under 35 U.S.C. 154(b) by 761 days.

(21) Appl. No.: 11/001,935

(22) Filed: Dec. 2, 2004

(65) Prior Publication Data

US 2005/0284036 A1    Dec. 29, 2005

(51) Int. Cl.
  *E04H 1/00*  (2006.01)
  *E04H 3/00*  (2006.01)
  *E04H 5/00*  (2006.01)
  *E04H 6/00*  (2006.01)
(52) U.S. Cl. .................. 52/79.1; 52/64; 52/DIG. 14; 70/233; 211/20; 414/229
(58) Field of Classification Search ........... 52/DIG. 14, 52/79.4, 79.1, 66, 236.3, 234, 64; 312/198, 312/199, 100; 206/315.1; 70/62, 233, 234, 70/235; 414/537, 538, 229; 211/17, 20, 211/23, 85.8, 1.51
See application file for complete search history.

(56) References Cited

U.S. PATENT DOCUMENTS

| | | | | |
|---|---|---|---|---|
| 3,883,002 A | * | 5/1975 | Moore | .......................... 211/18 |
| 3,945,159 A | * | 3/1976 | Girnus, Sr. | ...................... 52/66 |
| 4,015,718 A | * | 4/1977 | Bernard | .......................... 211/5 |
| 4,438,606 A | * | 3/1984 | Chardon et al. | .............. 52/79.1 |
| 4,920,334 A | * | 4/1990 | DeVolpi | .................. 340/568.4 |
| 5,278,538 A | * | 1/1994 | Ainsworth et al. | .......... 340/427 |
| 5,917,407 A | * | 6/1999 | Squire et al. | ................ 340/432 |
| 6,177,879 B1 | * | 1/2001 | Kokubu et al. | ............... 340/5.4 |
| 6,779,310 B2 | * | 8/2004 | Grover | ........................ 52/79.4 |

* cited by examiner

*Primary Examiner*—Brian E Glessner
*Assistant Examiner*—Christopher J Darner
(74) *Attorney, Agent, or Firm*—Timothy M. Barlow

(57) ABSTRACT

A multiple-level bicycle storing system includes a framework with a vertical support and a mounting frame defining upper and lower storing spaces. Each storing space includes a receiver to hold a bicycle. The upper receiver has a distal end, a proximal end and a U-shaped channel along the top surface. The upper receiver is pivotally attached to the mounting frame, enabling the upper receiver to tilt from horizontal to a loading and unloading position. The proximal end of the upper receiver is located near the floor when pivoted into the loading and unloading position. The upper receiver pivots up from the loading and unloading position into the horizontal storage position. The bicycles and the storing spaces are enclosed, and a floor separates the lower storing space from the upper storing space. Each storing space includes a lockable door and conceals the pivot point, upper receiver and bicycles inside the enclosure.

31 Claims, 11 Drawing Sheets

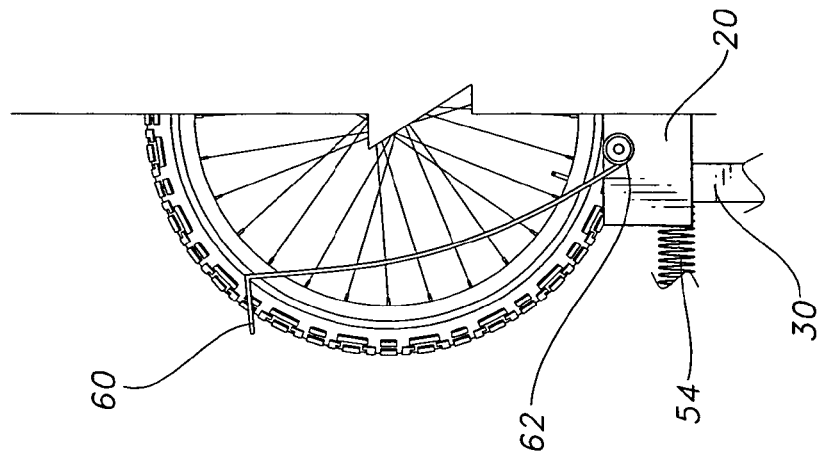
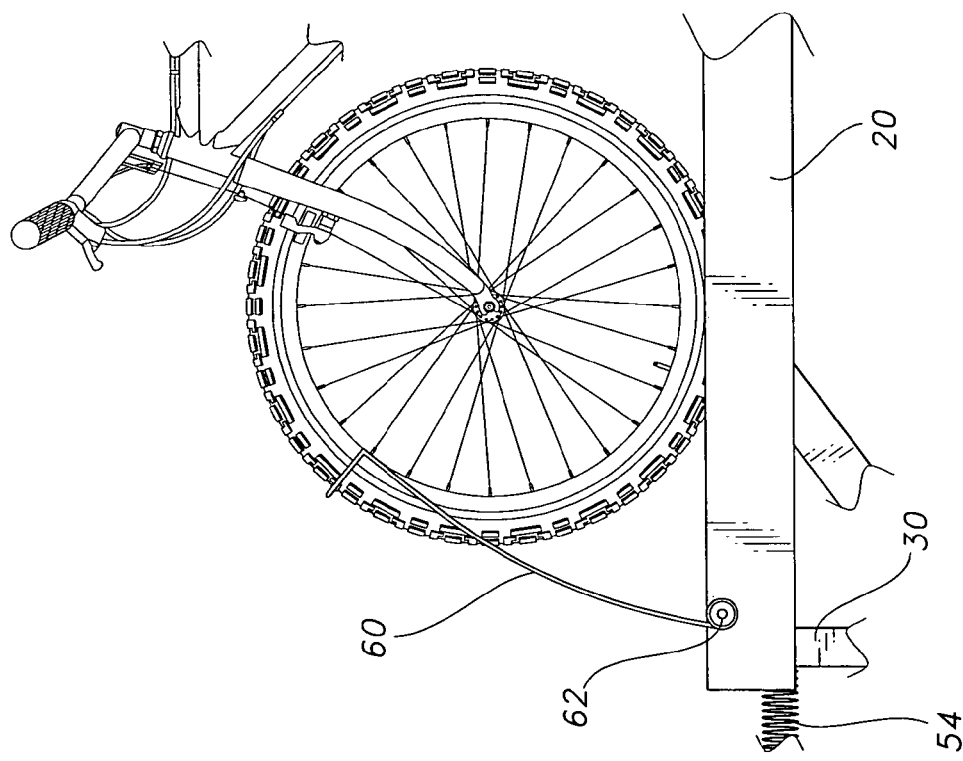
Fig. 3B
Fig. 3A

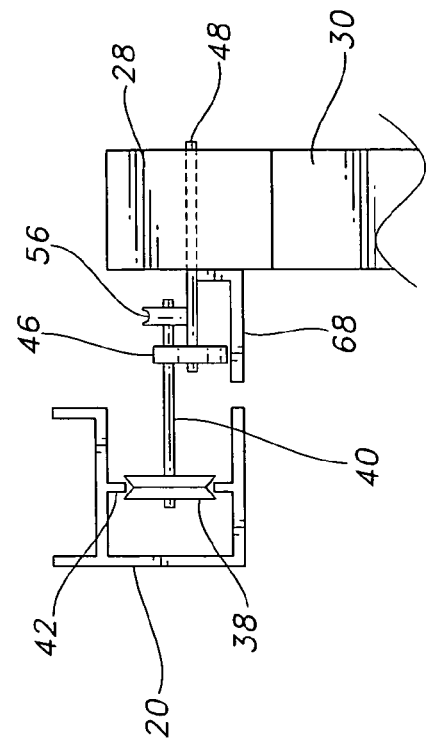
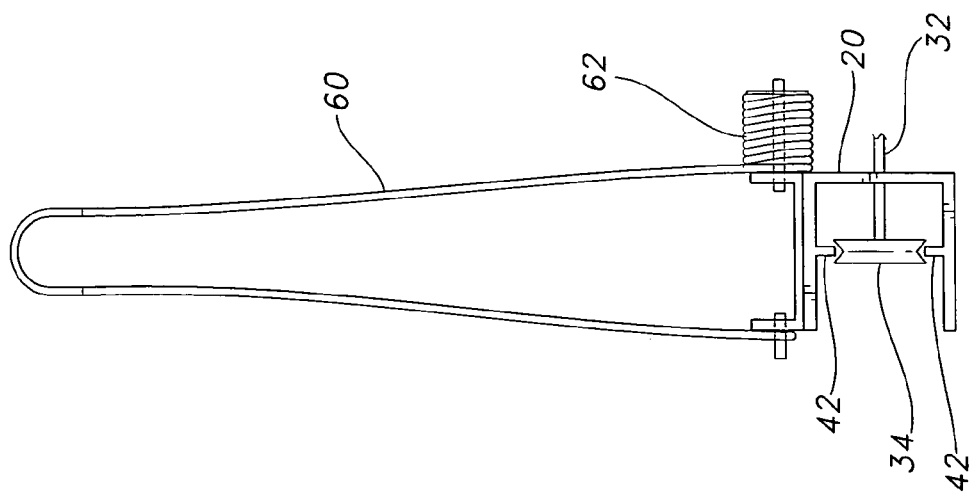

BILEVEL BICYCLE STORAGE SYSTEM

PRIORITY DATA

This application claims benefit of German Patent Application serial number 20 2004 009 779.6, filed on Jun. 28, 2004.

BACKGROUND OF THE INVENTION

1. Field of the Invention

The present invention pertains to storage systems for bicycles. More specifically, the present invention pertains to a multiple-level storing system for bicycles.

2. Description of the Prior Art

Bicycles are becoming more prevalent in many places. However, it is often difficult to find a safe or appropriate place to park the bike once you have arrived at your destination. Many different bike racks and similar devices have been developed to solve these issues, but these solutions are incomplete at best.

For example, arrays of a large number of exposed racks or rails have been implemented for many years. However, the bikes parked in these arrays are exposed to the elements and can contact each other, causing damage to the bikes. Other systems provide an individual storage box for each bike. However, these boxes are often leased to a particular user, and no one else can access them. Further, there are often not nearly enough boxes available usually because they take up too much space. Existing designs are bulky and are tall enough to accommodate only one bike. There is no provision for stacking bicycles in these enclosures.

Thus, it is desired that a multiple-level bicycle parking system be created, to provide more efficient use of space for parking bicycles. Further, a mechanism to raise and lower the bicycles to the upper storage spaces is desired, such a system requiring zero or minimal effort by the user. Further, it is desired that such bicycle parking spaces be open to all consumers, who will pay for the parking spaces based upon the amount of time they park there. Such a system should accept cash or noncash payments.

SUMMARY OF THE INVENTION

The device is a modular, two-level parking system for bicycles. The parking spaces include a mechanism to enable the user to easily insert and remove a bicycle into the upper parking space. To accommodate the upper bicycle, the device includes a movable upper receiver which is pivotally attached to a support frame. The pivoting upper guide bar enables simple loading or unloading of bicycles. It is drawn toward the customer from its horizontal, upper storing position and then angled downward so that the proximal end of the upper receiver is lowered to the floor. The bicycle can then be easily secured onto or removed from the upper receiver. The upper receiver is at least partially supported by spring tension or other comparable mechanism. A less complex lower receiver accommodates a bike in the lower parking space. The lower receiver is less complex because no lifting or lowering mechanism is required. The upper receiver is shifted or slid over the support frame so that the upper receiver protrudes into the customer's area of movement only during the loading and unloading procedure. This arrangement enables two bicycles to be stored one on top of another in a space-saving manner.

The stored bicycles are protected in three different ways: firstly against theft, secondly against accidental or intentional damages, and thirdly against weather conditions. A separate structure or a storage system within an existing building is usually provided for the storage system. The storage system—similar to automobile parking garages under surveillance—is run by a minimal number of personnel. Thus a parking fee is charged for storing a bicycle in such a storing system. The three above-mentioned types of protection are attained by the structure that houses the storing system and the personnel. Of course, buildings must be present in which such a storing system can be constructed, or open areas have to be available where a building for housing such a storing system can be constructed.

The enclosure may be locked to provide reliable protection against theft. The system uses standard, automatic locks to facilitate operating the system with a minimum number of personnel. Suitable lock-pay systems are already known in regard to lockers. The use of a door with such a lock enables the use of readily-available standard components, which can be significantly more economical than using special lock or bolt components. Locking doors eliminate the need to lock the bicycle to the upper receiver.

It is not necessary to construct a building or dedicated structure to house the storing system, because the storing system provides box-type enclosures for each storing space. The disclosed storing system can thus be erected at any location with sufficient free space. Thus the number of locations in which such a storing system could be erected is increased when compared to systems or locations requiring a separate, dedicated building to house a storing system.

Because a separate building to house the storing system is not necessary, the time required from planning to set-up of the storing system is significantly shorter. This system can be set up very quickly. For the previously-mentioned reasons and others, comprehensive protection of a bicycle is provided. The design is economically favorable and operation of the system provides a competitive advantage over previous systems.

In operating the upper storing space, the vertical raising and lowering movement of the upper receiver is carried out on a pivot point. The pivot point is the tension pulley axle that the front guide roller is mounted on. In the preferred embodiment, the pivot point operates as close to the front opening of the enclosure as possible in order to ensure that the upper receiver extends outside of the enclosure and does not collide with the lower enclosure and the lower storing space. In case the bi-level storing system is open and exposed, without enclosures, the pivot point of the upper receiver can, in contrast, be well inside and away from the front of the lower receiver, because the highest point of a bicycle stored underneath is the saddle. Thus the pivot point of the upper receiver can, for example, be directly above the saddle of the lower bicycle. In this example, the pivoted upper receiver, which is tilted downwards in its loading and unloading position, will not interfere with the rear wheel or rack of the bicycle stored below. Compared to this alternative construction, the pivot point of the enclosed upper receiver is, according to the invention, shifted to the front edge of the enclosure so that the lowered upper receiver clears the closed door of the lower enclosure.

The movement of the pivot point and the upper receiver is provided for by an upper mounting frame, on which the upper receiver is moved. The movable upper receiver, on which the bicycle is secured and which has its pivoting point on the mounting frame, can be moved to the front edge of the enclosure adjacent to the mounting frame and lowered for loading and unloading.

Alternatively, the upper receiver can be fixed to the mounting frame at the pivot bearing. Here, the mounting frame is horizontally extendible. In order to move the pivot point of the upper receiver, the upper receiver is moved together with the mounting frame. This enables the upper receiver to be moved toward the front of the enclosure together with the mounting frame until the pivot point is near the front edge of the enclosure.

A bicycle can be secured into the upper receiver by a wheel bail, or similar mechanism, so that it cannot be moved. The wheel bail is movable so that it reliably rests against one of the wheels of the bicycle due to its own elasticity or its movable, spring-loaded mechanism. In this manner the wheel bail controls the bicycle even when the bicycle moves on the upper receiver. A wheel lock is provided on the upper receiver in order to limit movement. The wheel lock holds the other wheel of the bicycle in place.

The wheel bail's elasticity and spring mechanism ensures that bicycles of various sizes with various dimensions between axles or different wheel sizes can be secured reliably. The elasticity of the wheel bail provides tolerance compensation and ensures that the wheel bail always rests against the wheel of the secured bicycle in the correct manner The wheel bail is provided at the distal end of the upper receiver and away from the customer so that it is not in the way when loading or unloading the bicycle and so that the bicycle can be mounted without demounting the system. The wheel lock can be constructed as a comparably small protrusion from the upper receiver. The bicycle to be secured can easily run over or be lifted over the wheel lock when loading or unloading the bicycle.

This is especially advantageous when the upper receiver is supported or counterbalanced by a spring. This spring support ensures that the spring is taut when the lowered upper receiver is in the loading and unloading position. Release of tension from the spring assists the customer on lifting the upper receiver to the horizontal storing position. In this manner the customer does not have to lift the complete weight of the bicycle and upper receiver when the upper receiver and the bicycle are lifted from the downwards-tilting loading and unloading position and to the horizontal storing position.

Support for the upper receiver can also be provided by a motor, especially an electric motor, attached between the mounting frame and the upper receiver, whereby the motor lifts the upper receiver from its tilted and lowered loading and unloading position into its horizontal storing position. The electric motor can operate the upper receiver by means of a gear mechanism, cable or chain so that the upper receiver is lifted into or lowered from its horizontal position. The use of a motor can ensure that the support almost or completely compensates for the weight of the upper receiver, with or without a bicycle, so that the customer does not need to exert himself to lift or lower the bicycle and upper receiver.

The space required for storage spaces with separate enclosures is larger than the space required by the optimum "packing density" of unprotected and unseparated bicycles stored next to each other. According to the invention, it is thus provided that the storing system with separate enclosures for each bicycle is to be combined with some open storage spaces without enclosures and to which the upper and lower receivers are arranged closer to each other than is the case where frames are employed. Thus, a larger number of bicycles can be stored in the same storing system, especially when the closely situated receivers are arranged in staggered heights to minimize or eliminate collisions between those bicycles. These storage systems without enclosures can, for example, be operated using appropriate automatic locking devices to secure each storing space until payment is received. Alternatively, payment may be completely inapplicable when municipal facilities offer free parking spaces in order to bring order to bicycle storage in designated areas.

One object of the invention is to provide secure, reliable protection for bicycles in a storing system run as economically as possible.

Another object of the invention is to teach a multiple-level storage system for bicycles.

Another object of the invention is to teach a multiple-level storage system for bicycles that includes a mechanism for loading and unloading a bicycle.

Another object of the invention is to teach a multiple-level storage system for bicycles that is modular.

Another object of the invention is to teach a multiple-level storage system for bicycles that provides protection against the weather.

Another object of the invention is to teach a multiple-level storage system for bicycles that provides protection against theft.

Another object of the invention is to teach a multiple-level storage system for bicycles that provides protection against accidental or intentional damages.

Another object of the invention is to teach a multiple-level storage system for bicycles where a bicycle storing space may be rented on a regular or irregular basis.

Another object of the invention is to teach a multiple-level storage system for bicycles that securely locks a bicycle until the owner claims it.

Another object of the invention is to teach a multiple-level storage system for bicycles that securely locks a bicycle until rent payment is received for the storage space.

Another object of the invention is to teach a multiple-level storage system for bicycles that is automated.

Another object of the invention is to teach a multiple-level storage system for bicycles that monitors its lock, payment and security systems.

Another object of the invention is to teach a multiple-level storage system for bicycles that requires a minimum number of personnel to operate.

Finally, it is an object of the present invention to accomplish the foregoing objectives in a simple and cost effective manner.

In the following section the invention is described in an exemplary manner according to extremely simplified, schematic drawings which are not drawn to scale.

BRIEF DESCRIPTION OF THE DRAWINGS

FIG. 3 shows a side view of the wheel bail of the Bilevel Bicycle Storage System, according to the invention;

FIG. 4 shows a distal end view of the upper receiver and mounting frame for the Bilevel Bicycle Storage System, according to the present invention;

FIG. 5 shows a detailed distal end view of the upper receiver, mounting frame and pivot mechanism for the Bilevel Bicycle Storage System, according to the present invention;

DETAILED DESCRIPTION OF THE PREFERRED EMBODIMENTS

Figure 1:
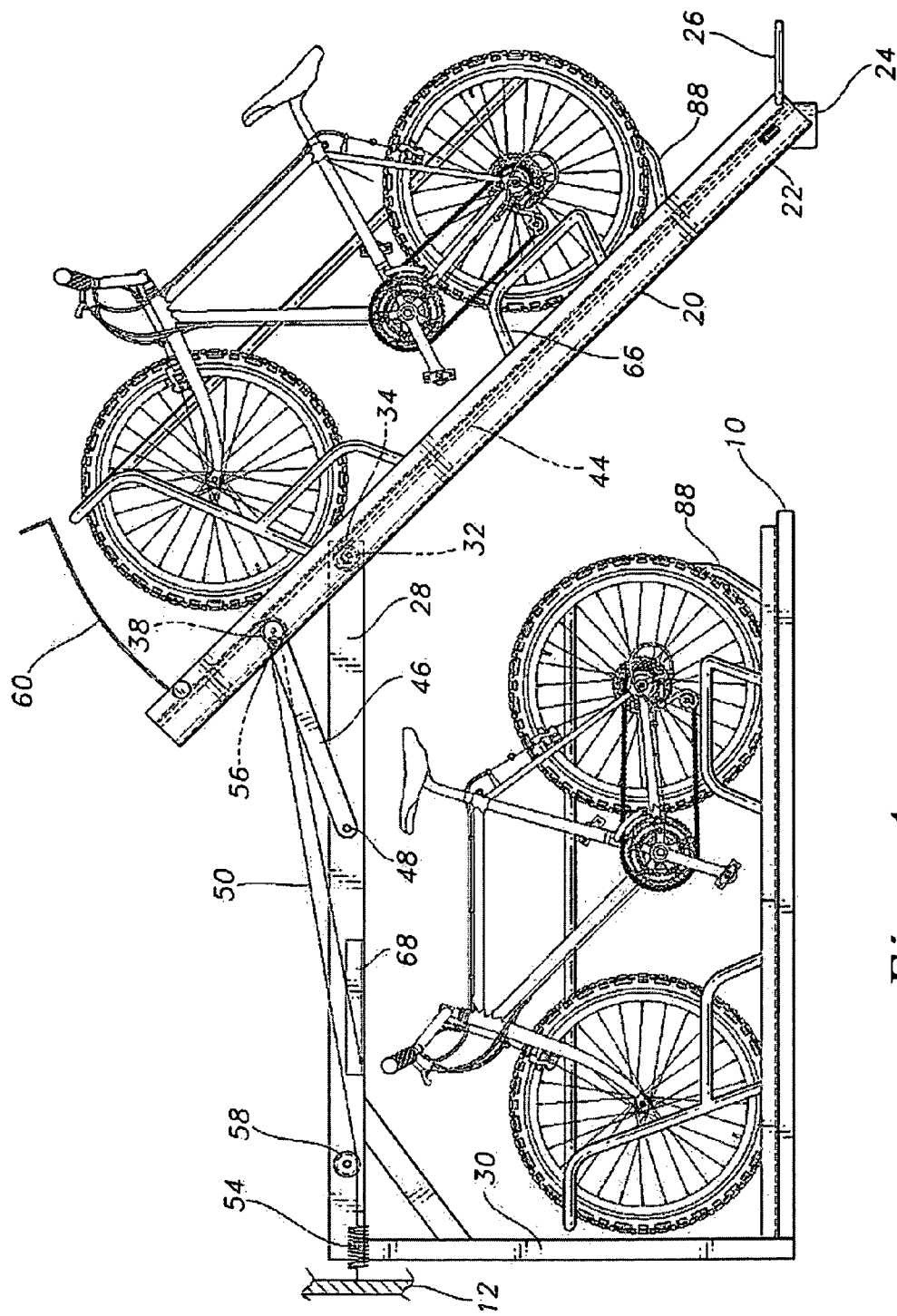
FIG. 1 shows a side view of a Bilevel Bicycle Storage System in the loading and unloading position, according to the invention.

FIG. 1 shows a side view of the Bilevel Bicycle Storage System, herein referred to as the Doubleparker. The Doubleparker has enough space to store two bicycles, one above the other. A lower receiver 10 is fixed to the floor within an enclosure 12 enclosure 12. The enclosure 12 has an upper door 14 and a lower door 16 attached with hinges to the front of the enclosure 12, see FIG. 8. The enclosure 12 has generally level upper floor panel 18 (see FIGS. 9 and 10) which separates the storing spaces from each other and also prevents water and soil from the upper storing space from dripping down onto the bicycle stored below. In another embodiment, the pair of storing spaces do not have a joint enclosure 12, but each storing space is contained within its own enclosure, which can be stacked and secured on top of each other.

An upper receiver 20, which is shown it loading and unloading position in FIG. 1, is provided for in the upper level of the Doubleparker. For loading and unloading a bicycle the upper receiver 20 is pulled out of the enclosure 12 and tilted downward so that the proximal end 22 of the upper receiver 20 is directed to the floor. A foot 24 is arranged below the proximal end 22 to prevent damage to the upper receiver 20 or the floor when the upper receiver 20 is lowered.

In FIG. 1 a bicycle is shown secured into the upper receiver 20. In this position the upper receiver 20 is easily lifted with a handle 26. The upper receiver 20 is raised into a generally horizontal position to insert the upper receiver 20 into the enclosure 12. In this manner the enclosure 12 can be secured and two bicycles stored, loaded and unloaded on top of each other in the enclosure 12.

Figure 2:
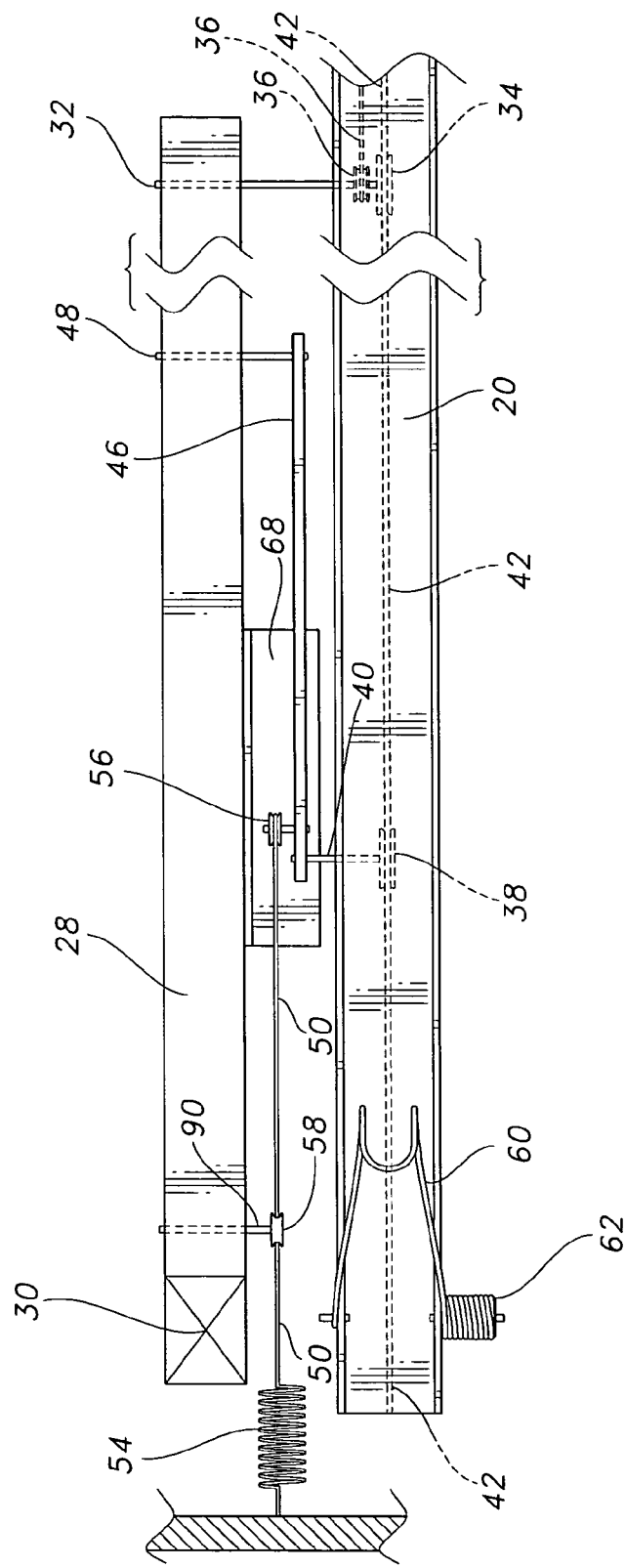
FIG. 2 shows a top view of the upper receiver mechanism of the Bilevel Bicycle Storage System, according to the invention.

FIG. 2 shows a top view of the upper receiver 20. Components within the upper receiver 20 are also visible through the upper receiver. A mounting frame 28 is provided to connect to the upper receiver 20, whereby the mounting frame 28 is fixed to a vertical support 30 which is attached to the floor. In another embodiment, the upper floor 18 between the two storing spaces can serve as a support for the mounting frame 28 instead of the vertical support 30. In this case the upper floor 18 would be fixed to the enclosure 12.

A tension pulley axle 32 is positioned horizontally on the proximal end of the mounting frame 28, upon which a front guide roller 34 and a tension pulley 36 are mounted. The proximal end of the mounting frame 28 is the end closest to the front of the enclosure 12 and the doors 14, 16. A rear guide roller 38 is mounted on a rear guide roller axle 40 which in turn is horizontally attached near the midpoint of the mounting frame 28. The upper receiver 20 travels forward and back on the rear guide roller 40 and front guide roller 34. The guide rollers 34, 40 engage a pair of guide rails 42 inside the top and bottom walls of the upper receiver 20. In FIG. 2 one guide rail 42 is represented by the dashed line parallel to the longitudinal axis of the upper receiver 20.

The tension pulley 36 is mounted on the tension pulley axle 32 next to the front guide roller 34. A retraction cable 44 is wound around the tension pulley 36 and the free end of the retraction cable 44 is attached inside the upper receiver 20 at the proximal end 22. A tension pulley spring (not shown) is attached to the tension pulley 36 and the tension pulley axle 32 and acts to wind the retraction cable 44 onto the tension pulley 36. The tension pulley spring may be integrated into the tension pulley 36 so that they are a single unit, or they may be separate pieces.

When the upper receiver 20 is pulled out of the enclosure 12, then the retraction cable 44 is pulled taut against the tension pulley spring. Thus, sufficient tension is available to assist the user in inserting the upper receiver 20 into the enclosure 12.

In other embodiments, the tension pulley 36 and spring are mounted to the enclosure 12 or other suitable support inside the enclosure 12. Alternatively, the tension pulley 36 and spring may be mounted to the upper receiver 20 with the pulley 36 located near the midpoint of the cable 44. The two free ends of the retraction cable 44 are fixed to the proximal end 22 of the upper receiver 20 and an immovable position that is beyond the distal end of the upper receiver 20 when the upper receiver is fully retracted.

A pivot link 46, shown as a flat bar, is arranged between the mounting frame 28 and the upper receiver 20. One end of the pivot link 46 is connected to the mounting frame 28 by a pivot shaft 48. The guide roller axle 40 is attached to the other end of the pivot link 46. The rear guide roller 38 is mounted to the guide roller axle 40. The upper receiver 20 moves parallel to its longitudinal axis and along the pivot link 46 by the rear guide roller 38. The pivot link 46 serves to guide the upper receiver 20 longitudinally and secures it against excessive lateral motion.

The pivot link 46 also aids in lifting the upper receiver 20. A tag line 50 runs from a tag anchor 52 on the mounting frame 28 to a levelling spring 54 attached to the enclosure 12 or another fixed location near the distal end of the mounting frame 28. In between the levelling spring 54 and the tag anchor 52, the tag line 50 is routed around a deflection pulley 56, mounted to the pivot link 46 opposite the pivot shaft 48, and an idler pulley 58 mounted to the mounting frame 28. When the upper receiver 20 is pulled out of the enclosure 12 and the proximal end 22 is lowered, the pivot link 46 pivots clockwise around the pivot shaft 48. The displacement of the pivot link 46 pulls the tag line 50 tight against the levelling spring 54. In this manner, a restoring force is created, which helps lift the upper receiver 20 to horizontal, whether unloaded or loaded with a bicycle.

The amount of support to the upper receiver 20 is easily adjusted by varying the strength or preload of the tension pulley spring and the levelling spring 54. This can be accomplished by the manufacturer or user. Multiple springs may be used in either or both positions if needed to provide an appropriate tension.

Bicycles are usually loaded and secured into the receivers 10, 20 in the travelling direction so that the front wheels of both bicycles in FIG. 1 are both arranged to the left, farthest into the enclosure 12. A wheel bail 60 is pivotally attached to the upper receiver 20 to hold the front wheel of the bicycle straight. The wheel bail 60 is biased by a bail spring 62 as shown in FIGS. 1 and 3 and thus rests against the front wheel of the bicycle secured in the upper receiver 20. The spring-mounted and flexible nature of the wheel bail 60 enables it to adjust to and partially encompass the bicycle wheel. In FIG. 2, the wheel is shown in cross-section. The wheel bail 60 can be constructed out of a plate stock or out of a wire material, whereby it can exhibit material-based elasticity. The wheel bail 60 can thus be pivoted about its root against in order to adapt to various diameters of bicycle wheels or to adapt to various overall bicycle lengths.

FIG. 3 shows the interaction of the wheel bail 60 with a bicycle wheel. FIG. 3 shows the wheel bail 60 in two different positions. It can take on these two positions and an infinite number of intermediate positions in adjusting itself to the dimensions of various bicycles. The bicycle can be pushed as far as a bail limiter (not shown) when storing a bicycle in the upper receiver 20, as shown in the position to the right of the wheel bail 60 in FIG. 3. The bicycle is automatically returned to the proximal end 22 of the upper receiver 20 due to the spring tension on the wheel bail 60 until the rear wheel of the bicycle rests against the wheel lock 78, explained below. This equilibrium position of the wheel bail 60 is represented by the position to the left in FIG. 3.

The upper receiver 20 has a channel built into its upper surface. The channel has a u-shaped or v-shaped cross-section to guide the wheels of the bicycle along the upper receiver 20. Two side flanks 66 are attached near the proximal end 22 of the upper receiver 20, see FIG. 1. These flanks 66 can be made from bar stock to form an open support framework or out of metal as complete sheets to form a wall. The flanks 66 enable the extremely reliable positioning and retention of the rear wheel in the upper receiver 20. The wheel bail 60 ensures that the rear wheel is located in the area of the flanks 66. As described earlier, the wheel bail 60 presses the bicycle toward the proximal end 22 of the upper receiver 20 and the flanks 66.

In the area of the proximal end 22 of the upper receiver 20 a wheel lock 78 is shown. The wheel lock 78 captures the bicycle wheel at the proximal end 22 of the upper receiver 20. As shown the wheel lock 78 is in the form of a cross-beam, which stretches across the channel atop the upper receiver 20 and against the spokes of the bicycle wheel. The low level of the wheel lock 78 above the upper receiver 20 aids in securing the bicycle in the upper receiver 20, and also ensures that the bicycle is close to the proximal end 22 of the upper receiver 20

An additional security feature is effected by slots or apertures through the flanks 66, through which a U-lock or a chain lock can be threaded. This provides protection against theft and safely fixes the bicycle in the upper receiver 20. The necessary slots or apertures are readily evident, especially when flanks 66 are made of curved round bar stock.

FIG. 5 shows a cross-section of the upper receiver 20 and pivoting mechanism lying flat in the storing position. The rear guide roller 38 is mounted on the guide roller axle 40, which extends from the pivot link 46 to the inside of the upper receiver 20. The groove-shaped U or V section of the upper receiver 20 is easily seen. The pivot link 46 is rotatably attached to the mounting frame 28 by the pivot shaft 48. The deflection pulley 56 can be seen behind the pivot shaft 48 in FIG. 5. The deflection pulley 56 is located behind the pivot shaft 48 in FIG. 5.

In FIG. 4 it is shown that the box profile of the upper receiver 20 can be open to the side opposite from the mounting frame 28. FIG. 4 shows that the bail spring 62 has a direct effect on the wheel bail 60. In one embodiment the bail spring 62 is offset from the root or pivot point of the wheel bail 60, closer to the proximal end 22 of the upper receiver 20, so that the wheel bail 60 is forced into a position resting against the bicycle. In another embodiment, the bail spring 62 is generally concentric with the root or pivot point of the wheel bail 60.

Figure 6:
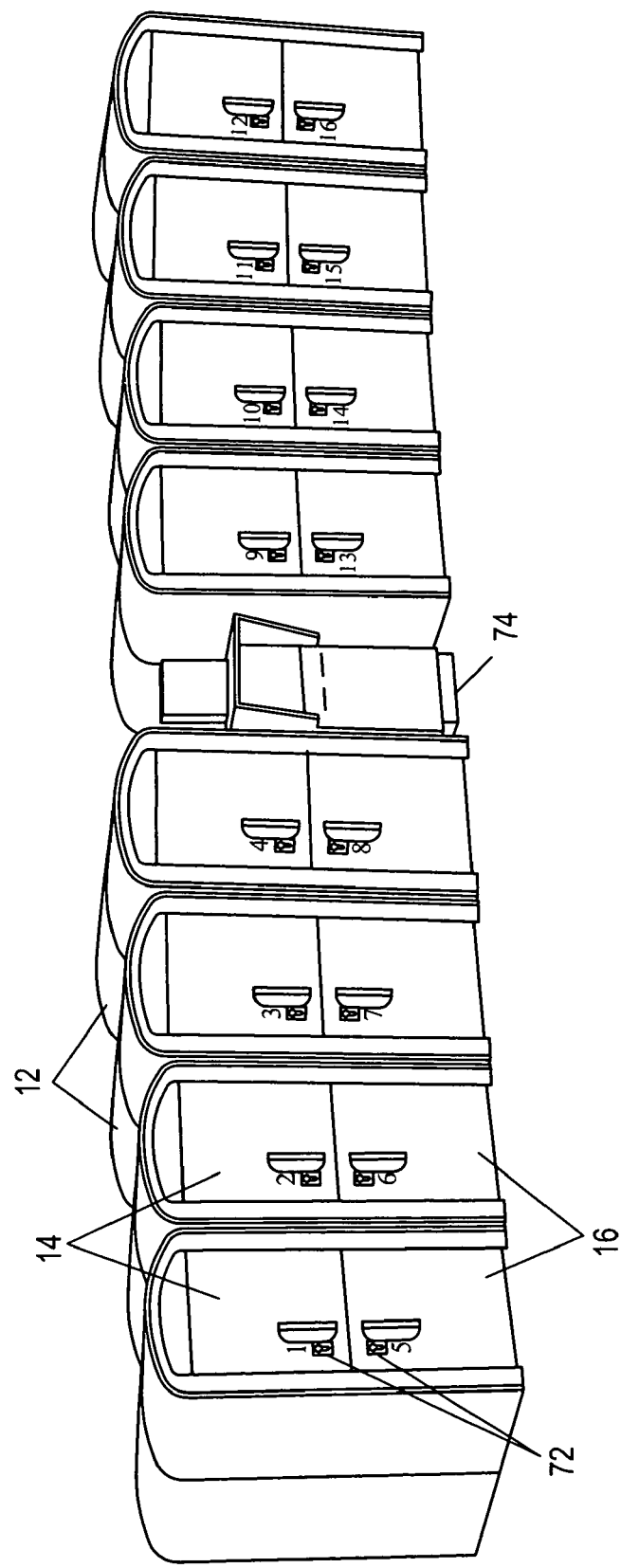
FIGS. 6-9 show various examples of the Bilevel Bicycle Storage System in use, according to the present invention.

The lower part of the upper receiver 20, which has a generally box-shaped profile, has upper and lower guide rails 42 which project inwards as presented in FIG. 6. These guide rails 42 form a track for the rear guide roller 38 and the front guide roller 34, which each have a circumferential groove for receiving the guide rails 42 to guide the upper receiver parallel to the mounting frame 28. When the upper receiver 20 is moved between its loading and unloading position and its storing position, it travels on the guide rollers 34, 38 and the guide rails 42. If the upper receiver 20 has a generally closed profile, elongated slots in the side of the upper receiver 20 will provide for the movement between the upper receiver 20 and the guide rollers 34, 38. The tension pulley axle 32 and the guide roller axle 40 extend through these elongated slots.

In FIG. 5, the pivot link 46 is shown in a horizontal position, parallel to the upper receiver 20. In this position, the pivot link 46 lies against the lower, horizontal section of a support bracket 68, so that the weight of the upper receiver 20, on which a bicycle could possibly be loaded, is supported not only by the tension pulley axle 32, the pivot shaft 48 and guide roller axles 34, 38, but also extensively by the support bracket 68 on the mounting frame 28.

FIG. 6 shows a line system of Doubleparkers, whereby the enclosures 12 have doors both above 14 and below 16, which are lockable using locks 72. This bicycle storing system can be operated by means of a terminal 74 set up among the enclosures 12.

The shown storing system or similar storing systems can be run fully automatically with few personnel. In such a system, the period of usage of each individual storing space is automatically registered, i.e. the elapsed time since the storing space was locked. The terminal or main controls attached to the terminal have a storage memory, which stores the time when every single storing space was locked, or if any storing spaces are not locked.

When a user wants to open a specific locked storing space, he must register at the terminal 74 first, identify the storing space and prove his right of access to the storing space. These three steps can be carried out by numerous actions, or just one single transaction, i.e. by using a key or access card or something similar, which the user can have checked at an appropriate reader or sensor at the terminal 74. The fee for use is dependent on the period of use for the identified storing space and can be displayed to the user at the terminal.

Payment of a fee for use can be made directly at the terminal or at one of the connected pay stations by using coins, bills or tokens or by cashless payments using debit or credit cards, or by providing account data and an ID-code. A data transfer from the terminal to a bank or other organization can be carried out depending on the required method of payment. This may be accomplished through a wired or wireless system. After payment is accepted, the appropriate storing space is automatically unlocked so that the user can open the door or the locking device of this storing space and remove his bicycle from the storing space.

A cabled or wireless data transfer from the terminal 74 to the main controls is provided via a telephone line or wireless communication system. The main controls can be a great distance away from a storing system—even hundreds of miles away. In this manner it is possible to run numerous storing systems from a collective main control system with few personnel. Technical information can be evaluated in the main control system, i.e. all errors or defects registered by sensors, so that service personnel can be sent to the storing system to repair and eliminate the defect or error. Sensory-detected information can also be stored and evaluated for business management reasons, i.e. it can be determined if any storing space is empty or if a bicycle is secured in the storing system, so that the utilization of the storing system can be evaluated for business management reasons. Invoices can also be drawn up in the main control system and sent to users, when, for example, long-term customers who do not need to pay directly at the terminal 74, but are billed at regular intervals, i.e. monthly.

Figure 7:
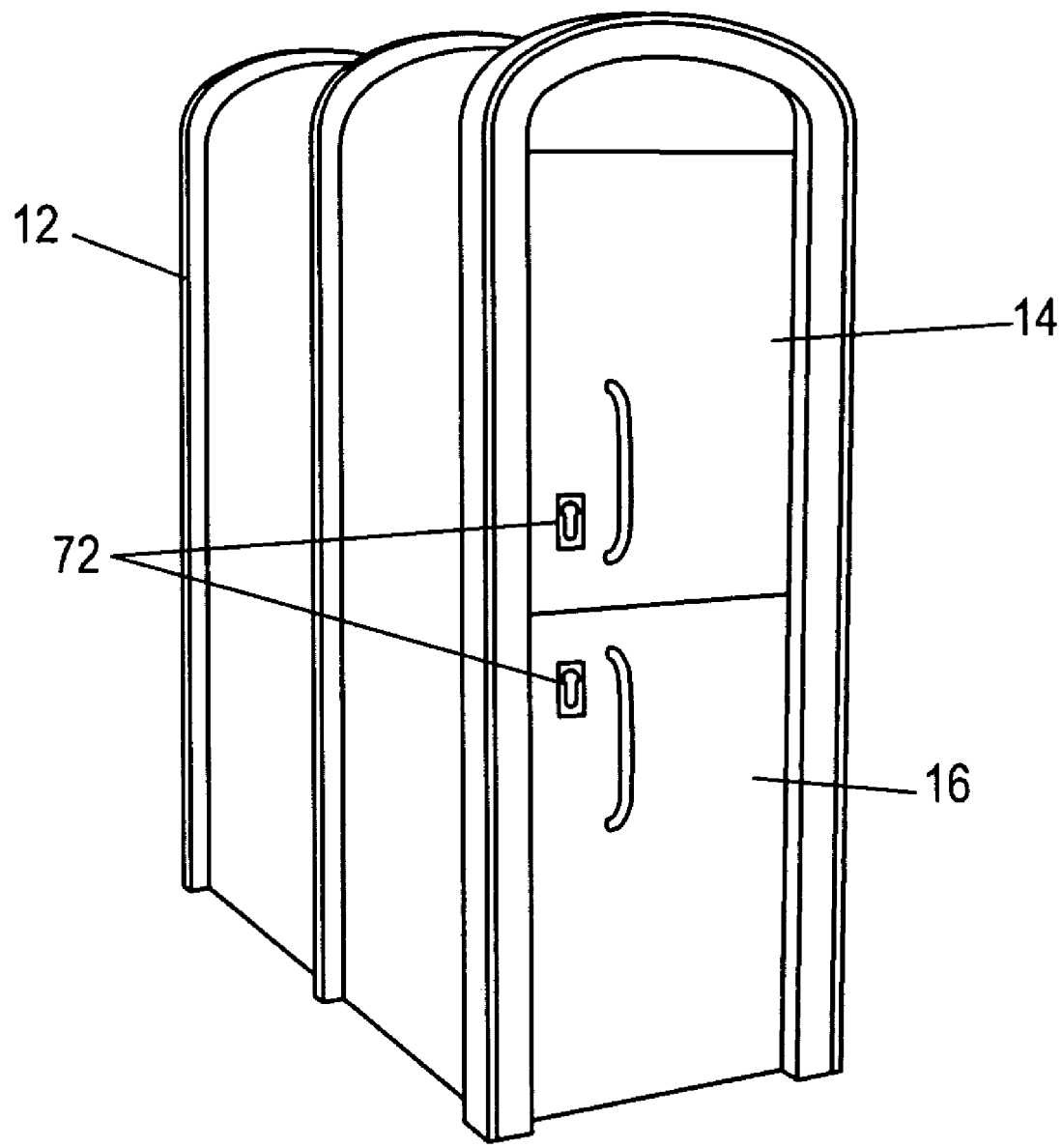

FIG. 7 shows a closer view of a single Doubleparker, where both doors 14, 16 are closed.

Figure 8:
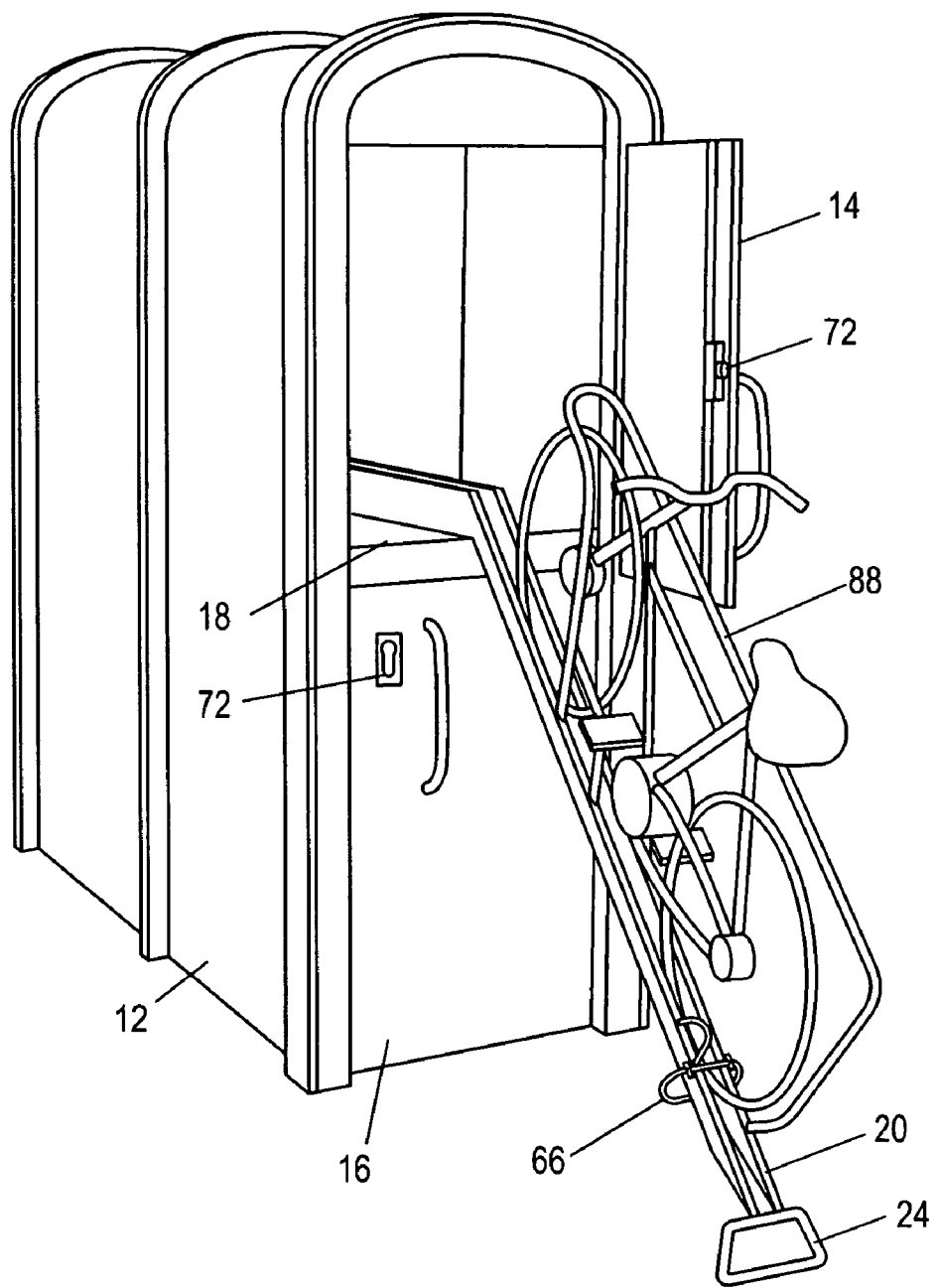

FIG. 8 shows a Doubleparker during the loading or unloading of the upper storing space. The wheel bail 60 and further details of the upper receiver 20 are not presented in this figure. A lean-against bracket 88 and clamps 78 are shown as an alternative to the wheel bail 60 and flanks 66. The lean-against bracket 88 is made of round pipe or tubing. In the preferred embodiment, the bracket 88 includes a protective cover made of a soft material, like PVC, in order to prevent damage to the bicycle frame. The bracket 88 aids in the security of the bicycle during loading, unloading and in the parking position. The leaning bracket 88 extends the entire length of the upper receiver 20 so that standard commercially-purchased chains or U-locks can be used to attach the bicycle to the bracket 88 in a number of user-defined positions. The lean-against bracket 88 is designed in such a way that the bicycle can be pushed into the upper or lower receiver until it is stable.

Figure 9:
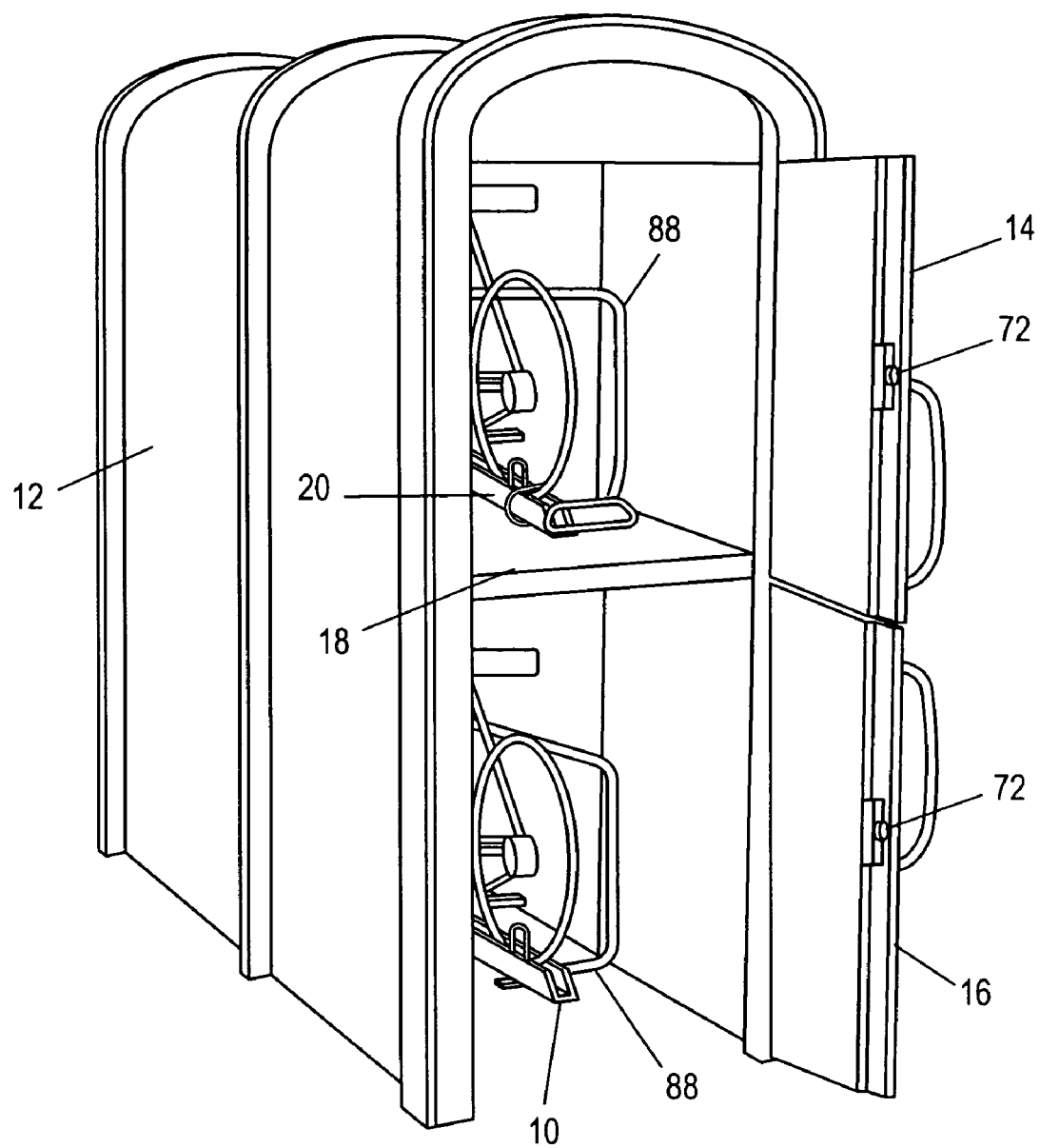

FIG. 9 shows a Doubleparker with two open doors, whereby both bicycles are shown in their storing position. The floor 18 is visible immediately below the upper receiver 20. The enclosure 12 may be clad or covered with a wide variety of suitable materials based upon decorative or functional requirements. In another embodiment, the lower storing space can be constructed so that the door 16 is curved or bent inward above its center, and with a matching profile on the enclosure 12, so that the top of the door 16 goes beneath the interior of the upper storing space. In this embodiment the pivot point near the proximal end of the mounting frame 28 is at the front edge of the enclosure 12. Any inward curve or bend in the front of the lower storing space would thus enable the upper receiver 20 to slant downward just above the bend, without interfering with the door 16 of the lower storing space.

In another embodiment, the upper receiver 20 is slidingly mounted to a guide bar 76. The guide bar 76 is slidingly mounted in turn to the mounting frame 28. The upper receiver 20 can be moved along the guide bar 76 so that the upper receiver 20 and the bicycle can be telescoped into the guide bar 76 and the guide bar 76 telescoped into the mounting frame 28. A much shorter overall length of the mounting frame 28 and the upper receiver 20 may be employed by telescoping them together. Minimal space is required for storing a bicycle in such a system.

The telescoping feature of the upper receiver 20 within the guide bar 76 allows for the upper receiver 20 to lower earlier as it is pulled out of the enclosure 12. It is not necessary to pull out the entire upper receiver 20 from the enclosure 12 and then lower the upper receiver 20 to the loading and unloading position only when the pivot point is near the leading edge of the enclosure. The telescoping feature of the guide bar 76 and the upper receiver 20 provides for easier handling of the upper receiver 20 and an early lowering of the upper receiver 20 so that easier handling is enabled for the customer when loading and unloading.

Figure 10:
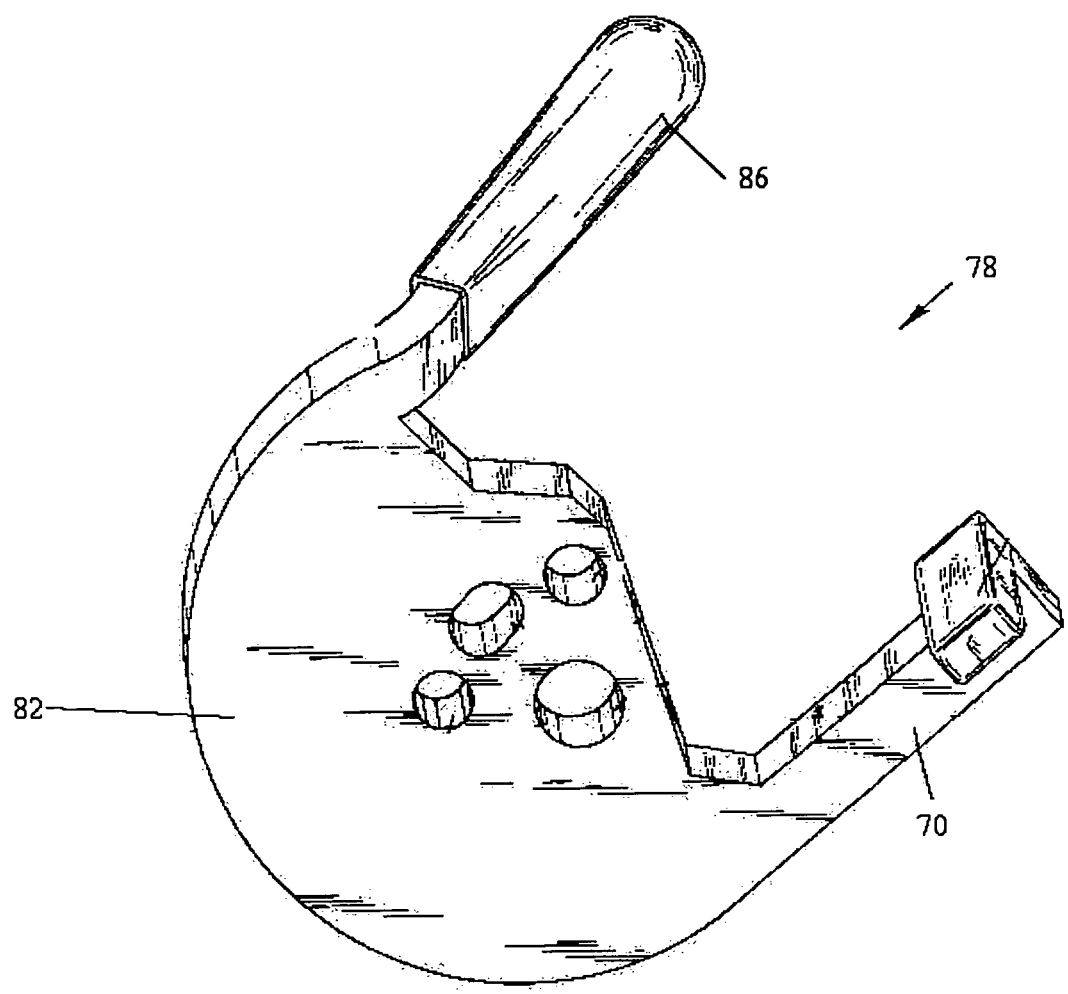
FIG. 10 shows a detailed view of a clamp arm for the Bilevel Bicycle Storage System, according to the present invention.
Figure 11:
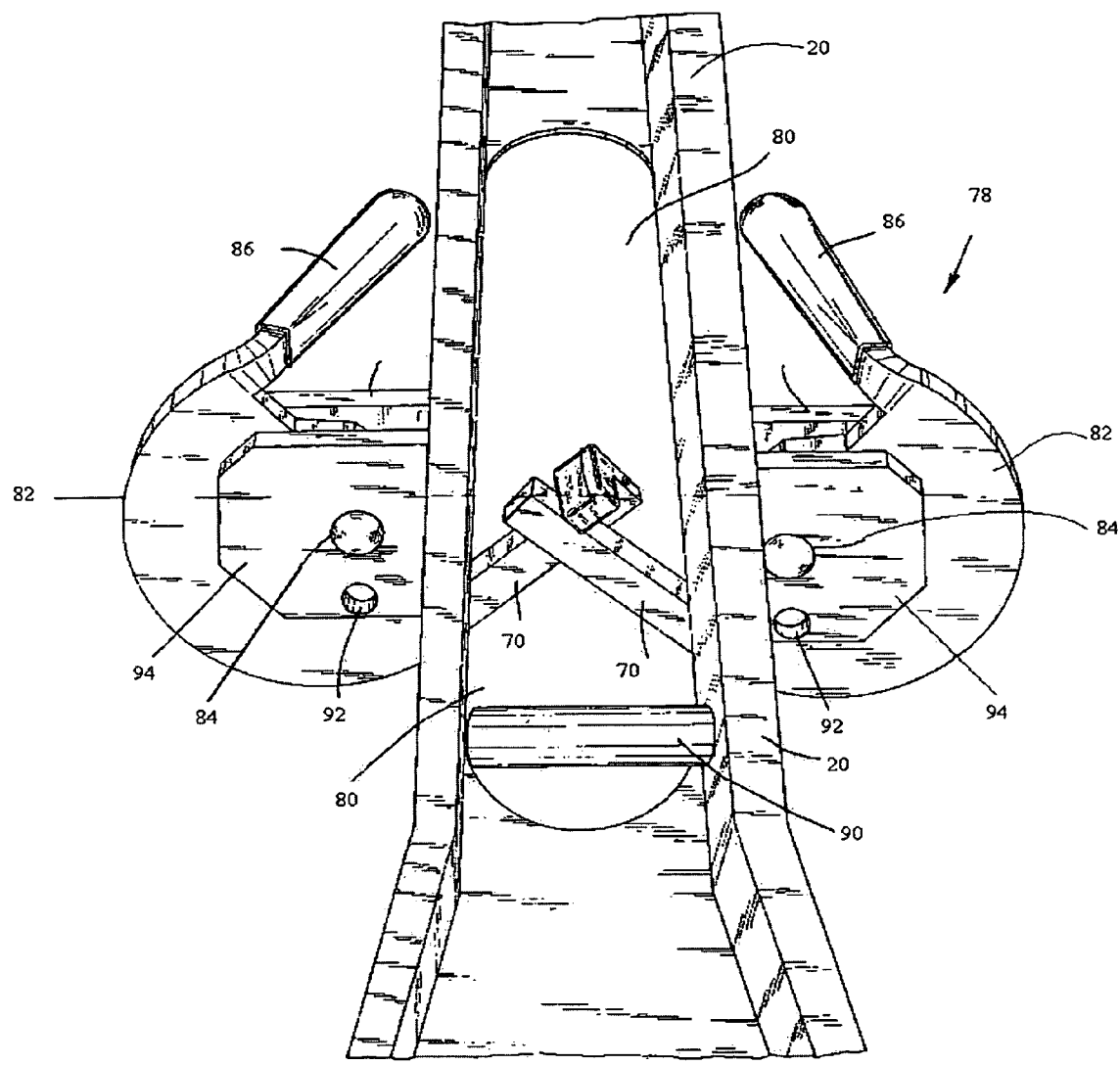
FIG. 11 shows a detailed view of the proximal end of the upper receiver for the Bilevel Bicycle Storage System, according to the present invention.
Figure 12:
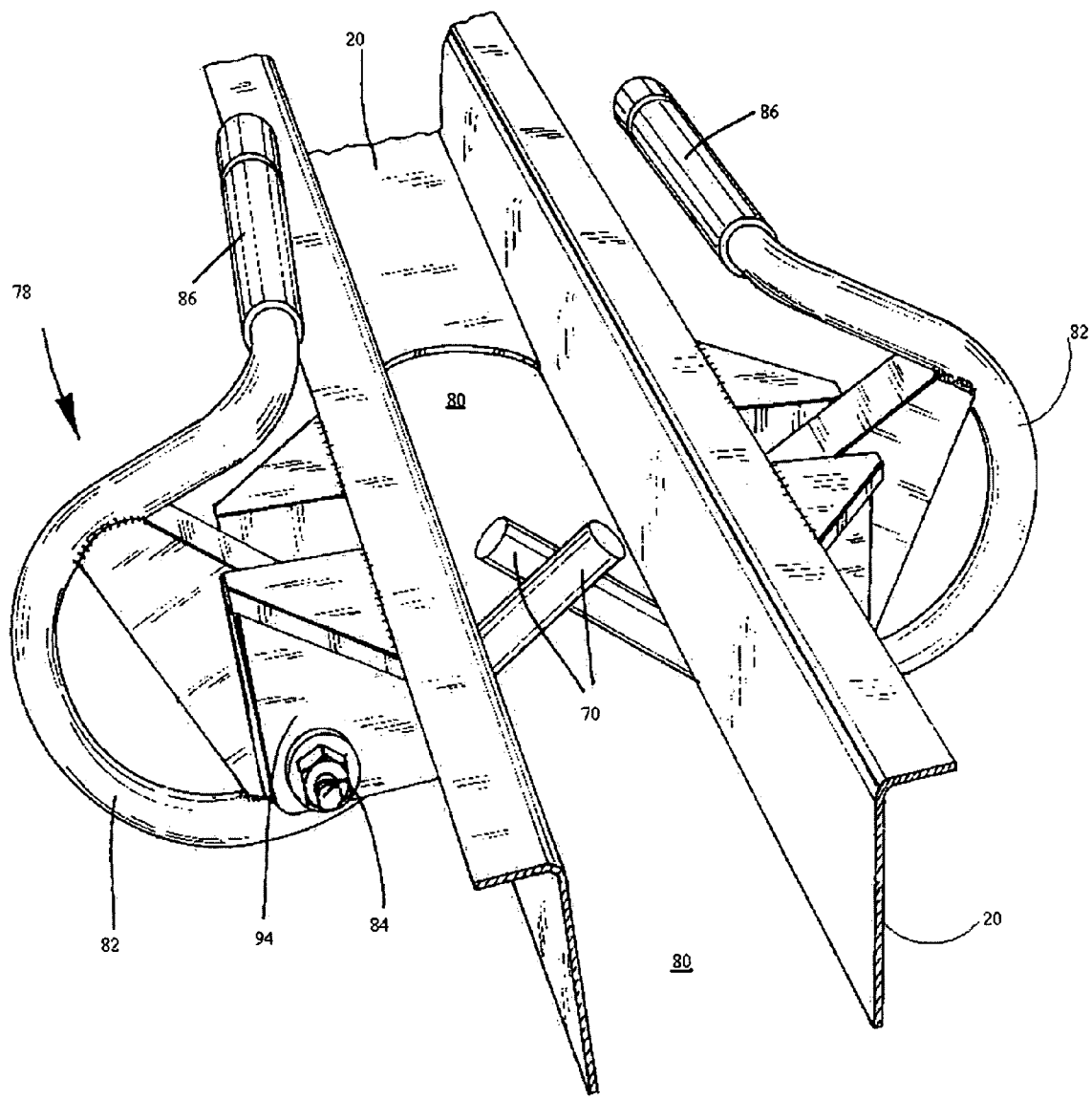
FIG. 12 shows a detailed view of an alternative embodiment of the proximal end of the upper receiver for the Bilevel Bicycle Storage System, according to the present invention.

FIGS. 10, 11 and 12 show a two-part bicycle retention clamp 78 that attaches to the receivers 10, 20. The clamp 78 uses the weight of the bicycle to secure the bicycle automatically, so that it cannot roll backward. The clamp 78 can be made of round stock, FIG. 12, or plate and sheet stock, FIGS. 10 and 11. Clamp 78 movement occurs as the bicycle enters the elongated hole 80 in the receiver 10, 20 due to its own weight. A pair of clamp arms 82 pivot about a pair of hinge points 84 outside the receiver 10, 20 on a pair of clamp mounts 94. A pair of actuator arms 70 overlap inside the elongated hole 80 so that the bicycle wheel acts upon the clamp arms 82 uniformly. A pair of clamp pads 86 bear against the bicycle wheel in response to the weight of the bicycle upon the actuator arms 70. The clamp 78 opens to release the wheel when the bicycle wheel is lifted out of the elongated hole 80 in the receiver 10, 20. Retention roller 90 may be employed to prevent shifting.

The clamp 78 can be used in all rail-like facilities in which the bicycle is pushed on or into the system. On the lower level, where a determination of the bicycle in the receiver is perhaps not necessary due to handling or security considerations, this locking device may still be provided for additional safety to hold the bicycles reliably. The clamp 78 may be incorporated into a security system to protect against theft. The clamp 78 can be devised as a mechanical self-locking device, so that the clamp automatically goes from open to locked when a bicycle is pushed into the storing system. A simple mechanical lock may be used with the lock apertures 92 on each clamp arm 82.

The clamp 78 can be controlled using appropriate sensors as well. As soon as the bicycle is in the "parking position" the bicycle is automatically locked. Additional sensors monitor the parking time and user identification by means of software, hardware and clock timers. The clamp 78 can be opened again by means of payment or other arrangement.

I claim:

1. A multiple-level storing system for bicycles comprising:
A framework attached to a floor, the framework including a vertical support and a horizontal mounting frame defining a lower storing space for a lower bicycle and an upper storing space for an upper bicycle, whereby the lower storing space includes a lower receiver to hold the lower bicycle and the upper storing space includes an upper receiver to hold the upper bicycle, the upper receiver having a distal end and a proximal end and a U-shaped bicycle wheel channel or groove along the entire length of the top surface of the upper receiver, wherein the upper receiver is pivotally attached at a pivot point to the horizontal mounting frame to enable the upper receiver to tilt from a horizontal position to a loading and unloading position, whereby the proximal end of the upper receiver is located near the floor when pivoted into the loading and unloading position, the upper receiver pivots up from the loading and unloading position into a generally horizontal storage position, wherein the upper receiver is longitudinally movable along the pivot point on the horizontal mounting frame wherein the proximal end of the upper receiver is drawn toward the user and away from the mounting frame to better reach the floor for loading and unloading and the upper receiver is slid back along the mounting frame upon the conclusion of loading and unloading, wherein an enclosure surrounds the bicycles in both the lower and upper storing space, an upper floor separates the lower storing space from the upper storing space, and each storing space including a lockable door, wherein the pivot point, upper receiver and any bicycles are located inside the enclosure enabling both doors to close and conceal the bicycles.

2. The multiple-level storing system for bicycles of claim 1, further comprising a telescoping support frame attached between the mounting frame and the upper receiver, whereby the upper receiver moves along the telescoping support frame as the telescoping support frame moves along the mounting frame wherein the collapsed mounting frame, telescoping support frame and upper receiver are only as long as a bicycle, minimizing space requirements for the device.

3. The multiple-level storing system for bicycles of claim 1, further comprising A flexible wheel bail attached near the distal end of the upper receiver, the wheel bail shaped to accept a bicycle wheel, the wheel bail being flexible to absorb the energy of a bicycle rolled into it and flexible to direct the bicycle back toward the proximal end of the upper receiver and a wheel stop mounted at the proximal end, the wheel stop forming a mechanical barrier to prevent the bicycle from departing the upper receiver unintentionally.

4. The multiple-level storing system for bicycles of claim 3, further comprising a wheel bail spring mounted to the wheel bail and the upper receiver and biasing the wheel bail toward the proximal end of the upper receiver, whereby the wheel bail spring acts to force a bicycle back toward the wheel stop when the bicycle is placed so far onto the upper receiver as to displace the wheel bail.

5. The multiple-level storing system for bicycles of claim 1, further comprising a tension pulley mounted inside the upper receiver at the pivot point, a retraction cable with a coiled end and a free end, whereby the coiled end is wrapped around the tension pulley and the free end is attached to the proximal end of the upper receiver, and a coiled tension pulley spring attached between the tension pulley and the pivot point, whereby the longitudinal motion of the upper receiver away from the mounting frame tension in the tension pulley spring and creates a restoring force on the upper receiver, thus controlling the speed with which the upper receiver is lowered into the loading and unloading position, the restoring force providing a lessened effort when returning the upper receiver into the storing position.

6. The multiple-level storing system for bicycles of claim 1, further comprising a pivot link pivotally attached to the mounting frame and near the distal end of the upper receiver and a pivot spring having one end attached to the mounting frame and the other end attached to the pivot link near where the pivot link attaches to the upper receiver, where the pivot link limits the amount of tilt the upper receiver can accomplish and the pivot spring provides a restoring force to return the upper receiver to a level position.

7. The multiple-level storing system for bicycles of claim 1, further comprising
a pivot link with a pivoting end pivotally attached to the mounting frame and a free end attached near the upper receiver;
a deflection pulley rotatably attached to the free end of the pivot link, where the deflection pulley is located between the pivot link and the mounting frame;
an idler pulley rotatably attached to the mounting frame;
a support bracket comprising a flat plate attached horizontally to the mounting frame beneath the pivot link, where the pivot link bears directly on the support bracket when the upper receiver is in the horizontal storing position;
a levelling spring attached at one end to the interior of the enclosure, the other end attached to a tag line, the tag line having two ends, where one end is anchored to the support bracket and the other end is attached to the levelling spring, where the tag line is routed around the deflection pulley and the idler pulley, the pivot link limits the amount of tilt the upper receiver can accomplish in the loading and unloading position, the levelling spring provides a restoring force through the tag line to return the upper receiver to a level position and the support bracket prevents the upper receiver from tilting past horizontal when in the storing position.

8. The multiple-level storing system for bicycles of claim 7, further comprising:
a front guide roller rotatably mounted to a tension pulley axle, the tension pulley axle attached to and defining the pivot point on the mounting frame, the front guide roller having a circumferential groove for riding on a pair of guide rails inside the top and bottom walls of the upper receiver; and
a rear guide roller rotatably mounted to a guide roller axle, the guide roller axle attached near the free end of the pivot link, the rear guide roller having a circumferential groove for riding on the guide rails, whereby the interaction of the two guide rollers and guide rails permits the upper receiver to roll smoothly parallel to the mounting frame and minimizes lateral movement of the upper receiver even when the upper receiver is in the tilted loading and unloading position.

9. The multiple-level storing system for bicycles of claim 1, further comprising a motor attached between the mounting frame and the upper receiver, whereby the motor lifts the upper receiver from its tilted and lowered loading and unloading position into its horizontal storing position.

10. The multiple-level storing system for bicycles of claim 9, where the motor is electric.

11. The multiple-level storing system for bicycles of claim 1, further comprising a control terminal for controlling and monitoring an occupancy status of a plurality of bicycle storing spaces.

12. The multiple level storing system for bicycles of claim 11, wherein the control terminal controls and monitors a lock for each individual bicycle storing space.

13. The multiple level storing system for bicycles of claim 12, wherein the control terminal accepts payment from a user for the use of a storing space.

14. The multiple level storing system for bicycles of claim 13, wherein the control terminal accepts payment in the form of coins, bills, tokens, credit cards and debit cards.

15. The multiple level storing system for bicycles of claim 13, wherein the control terminal accepts cashless payments by entering account data and codes.

16. The multiple level storing system for bicycles of claim 11, wherein the control terminal is connected to a main control center via a cabled or wireless communication system.

17. The multiple level storing system for bicycles of claim 11, wherein the control terminal is connected to each individual bicycle storing space via a cabled or wireless communication system.

18. A multiple-level storing system for bicycles comprising:
a framework attached to a floor, the framework including a vertical support and a horizontal mounting frame defining a lower storing space for a lower bicycle and an upper storing space for an upper bicycle, whereby the lower storing space includes a lower receiver to hold the lower bicycle and the upper storing space includes an upper receiver to hold the upper bicycle, the upper receiver having a distal end and a proximal end and a U-shaped bicycle wheel channel or groove along the entire length of the top surface of the upper receiver, wherein the upper receiver is pivotally attached at a pivot point to the horizontal mounting frame to enable the upper receiver to tilt from a horizontal position to a loading and unloading position, wherein the upper receiver is longitudinally movable along the pivot point on the horizontal mounting frame wherein the proximal end of the upper receiver is drawn toward the user and away from the mounting frame to better reach the floor for loading and unloading and the upper receiver is slid back along the mounting frame upon the conclusion of loading and unloading, whereby the proximal end of the upper receiver is located near the floor when pivoted into the loading and unloading position, the upper receiver pivots up from the loading and unloading position into a generally horizontal storage position, whereby an enclosure surrounds the bicycles in both the lower and upper storing space, an upper floor separates the lower storing space from the upper storing space, and each storing space including a lockable door, whereby the pivot point, upper receiver and any bicycles are located inside the enclosure enabling both doors to close and conceal the bicycles.

19. The multiple-level storing system for bicycles of claim 18, further comprising a tension pulley mounted inside the upper receiver at the pivot point, a retraction cable with a coiled end and a free end, whereby the coiled end is wrapped around the tension pulley and the free end is attached to the proximal end of the upper receiver, and a coiled tension pulley spring attached between the tension pulley and the pivot point, whereby the longitudinal motion of the upper receiver away from the mounting frame tension in the tension pulley spring and creates a restoring force on the upper receiver, thus controlling the speed with which the upper receiver is lowered into the loading and unloading position, the restoring force providing a lessened effort when returning the upper receiver into the storing position.

20. The multiple-level storing system for bicycles of claim 18, further comprising
   a pivot link with a pivoting end pivotally attached to the mounting frame and a free end attached near the upper receiver;
   a deflection pulley rotatably attached to the free end of the pivot link, where the deflection pulley is located between the pivot link and the mounting frame;
   an idler pulley rotatably attached to the mounting frame;
   a support bracket comprising a flat plate attached horizontally to the mounting frame beneath the pivot link, where the pivot link bears directly on the support bracket when the upper receiver is in the horizontal storing position;
   a levelling spring attached at one end to the interior of the enclosure, the other end attached to a tag line, the tag line having two ends, where one end is anchored to the support bracket and the other end is attached to the levelling spring, where the tag line is routed around the deflection pulley and the idler pulley, the pivot link limits the amount of tilt the upper receiver can accomplish in the loading and unloading position, the levelling spring provides a restoring force through the tag line to return the upper receiver to a level position and the support bracket prevents the upper receiver from tilting past horizontal when in the storing position.

21. The multiple-level storing system for bicycles of claim 20, further comprising:
   a front guide roller rotatably mounted to a tension pulley axle, the tension pulley axle attached to and defining the pivot point on the mounting frame, the front guide roller having a circumferential groove for riding on a pair of guide rails inside the top and bottom walls of the upper receiver; and
   a rear guide roller rotatably mounted to a guide roller axle, the guide roller axle attached near the free end of the pivot link, the rear guide roller having a circumferential groove for riding on the guide rails, whereby the interaction of the two guide rollers and guide rails permits the upper receiver to roll smoothly parallel to the mounting frame and minimizes lateral movement of the upper receiver even when the upper receiver is in the tilted loading and unloading position.

22. The multiple-level storing system for bicycles of claim 21, further comprising a control terminal for controlling and monitoring an occupancy status of a plurality of bicycle storing spaces.

23. The multiple level storing system for bicycles of claim 22, wherein the control terminal controls and monitors a lock for each individual bicycle storing space.

24. The multiple level storing system for bicycles of claim 23, wherein the control terminal accepts payment from a user for the use of a storing space.

25. The multiple level storing system for bicycles of claim 24, wherein the control terminal accepts payment in the form of coins, bills, tokens, credit cards and debit cards.

26. The multiple level storing system for bicycles of claim 25, wherein the control terminal accepts cashless payments by entering account data and codes.

27. The multiple level storing system for bicycles of claim 26, wherein the control terminal is connected to a main control center via a cabled or wireless communication system.

28. The multiple level storing system for bicycles of claim 27, wherein the control terminal is connected to each individual bicycle storing space via a cabled or wireless communication system.

29. The multiple level storing system for bicycles of claim 18, further comprising a leaning bracket attached to the upper receiver or the lower receiver, wherein the leaning bracket comprises a rail that defines a wall against which the bicycle can be leaned, and a loop that defines a wheel-shaped enclosure, wherein the front wheel of the bicycle is placed into the loop as the bicycle is placed onto the upper receiver and leaned against the wall.

30. The multiple level storing system for bicycles of claim 29, where the leaning rail comprises a tubular skeleton.

31. The multiple level storing system for bicycles of claim 30, where the leaning rail comprises a protective coating.

* * * * *